May 3, 1966 H. KARLBY ETAL 3,248,944
TURBINE FLOW METER
Filed Oct. 11, 1963 11 Sheets-Sheet 1

INVENTORS
HENNING KARLBY
WINSTON F. Z. LEE
BY Strauch, Nolan & Neale
ATTORNEYS

May 3, 1966 H. KARLBY ET AL 3,248,944
TURBINE FLOW METER
Filed Oct. 11, 1963 11 Sheets-Sheet 4

INVENTORS
HENNING KARLBY
WINSTON F. Z. LEE
BY Strauch, Nolan + Neale
ATTORNEYS

May 3, 1966 H. KARLBY ETAL 3,248,944
TURBINE FLOW METER
Filed Oct. 11, 1963 11 Sheets-Sheet 5

INVENTORS
HENNING KARLBY
WINSTON F. Z. LEE
BY Strauch, Nolan + Neale
ATTORNEYS

May 3, 1966  H. KARLBY ETAL  3,248,944
TURBINE FLOW METER
Filed Oct. 11, 1963  11 Sheets-Sheet 10
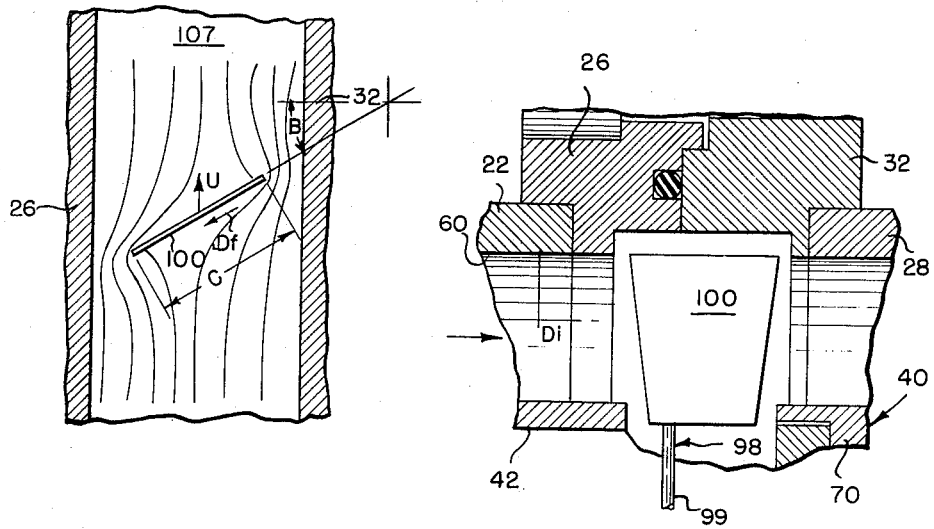
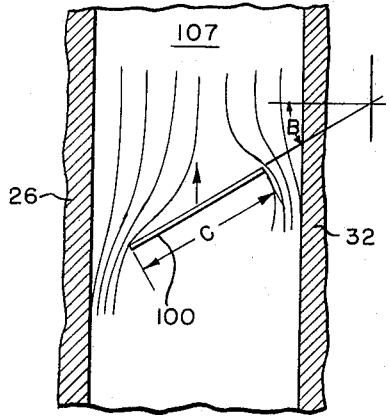
INVENTORS
Henning Karlby
Winston F. Z. Lee
BY Strauch, Nolan & Neale
ATTORNEYS

United States Patent Office 3,248,944
Patented May 3, 1966

3,248,944
TURBINE FLOW METER
Henning Karlby, Pittsburgh, and Winston F. Z. Lee, Verona, Pa., assignors to Rockwell Manufacturing Company, Pittsburgh, Pa., a corporation of Pennsylvania
Filed Oct. 11, 1963, Ser. No. 315,638
17 Claims. (Cl. 73—231)

This application is a continuation-in-part of our copending application Serial No. 717,863, filed February 27, 1958 and now abandoned, our copending application Serial No. 634,662, filed January 17, 1957, now Patent No. 3,163,041, and our copending application Serial No. 795,755, filed February 26, 1959.

The present invention relates to fluid meters and more particularly to improvements in turbine meters for eliminating variations in metering-rotor slip, or error, over a wide flow rate operating range whereby the accuracy of the meter is improved.

At present, three different basic types of meters are in wide usage for the measurement of fluid flow: reciprocating and rotary positive displacement meters, and orifice meters. Reciprocating positive displacement type meters are accurate and suited for fluctuating flow, but are rather bulky, expensive, and good for low pressure only. This type of meter is thus limited to use in measuring low rates of flow. Rotary positive displacement type meters have been accepted as accurate instruments for measuring medium quantities of fluid at low or moderate pressure. They become intolerably bulky and expensive when designed for large rates of flow or high pressure. The orifice meter has been long recognized as the simplest form of measuring apparatus for medium and large flow rates at all practical line pressures. It has the inherent disadvantage of low flow ratio due to the fact that the rate of flow is proportional to the square root of the measured quantities. It is not a measuring device of high accuracy and is unfitted for metering fuctuating flow. To obtain the total flow, its chart must be integrated with an expensive integrator, a time-consuming operation.

From the above considerations, it is apparent that, heretofore, there have been no satisfactory instruments in general use for the direct measurement of both steady and fluctuating flow of medium and large rates at moderate and high pressures with high accuracy, large flow ratio, and small head loss. The present invention contemplates the provision of a turbine meter of improved construction which satisfies these requirements, and has the ability to provide registration without an external power source.

Turbine meters, as such, have been known for many years but none, insofar as we are presently aware, have been of a design which is effective to provide an accurate direct measurement of both steady and fluctuating flow at medium and large rate and moderate and high pressures over a large flow rate range with small head loss as is essential in any commercially acceptable turbine meter. Examples of patented prior art turbine meters are disclosed in United States Patent No. 697,492, issued April 15, 1902 to W. H. Kelly et al. for Electromagnetic Water Meter; No. 1,463,865, issued August 7, 1923 to R. S. Blair for Fluid Meter; 2,593,285, issued April 15, 1952 to C. H. Fay et al. for Oil Well Flow Meter, and No. 2,713,261, issued July 19, 1955 to G. J. Butterworth et al. for Self-Contained Flow Meters.

Since the total volume of fluid passed through a turbine meter is represented by the number of revolutions made by the metering rotor, a basic requirement for obtaining direct and highly accurate measurements is that the meter registration ratio of rotational speed of the metering rotor to fluid flow rate ($\omega/Q$) must be substantially constant throughout the entire range of fluid flow rates to which the meter is subjected. This means that the number of turns ($\phi$) made by the metering rotor per unit volume (V) of fluid passed through the meter is required to be substantially constant throughout the meter operating flow range.

In a theoretically perfect fluid metering system where no resisting torques are present to oppose the rotation imparted to the metering rotor by the fluid being metered, the meter registration ratio $\omega/Q$ or $\phi/V$ will be ideally constant. Under actual conditions, however, there are resisting forces which retard rotation of the metering rotor by the fluid being metered. This results in the actual angular velocity of a turbine metering rotor being somewhat less than its theoretically ideal velocity for any given fluid flow rate. This difference is known as the absolute "slip" which broadly designates those effects which tend to reduce the actual $\omega/Q$ registration ratio to a value below the ideal value that would result if all the fluid passing through the turbine were metered and registered.

If the metering-rotor slip, or, more particularly, the actual registration ratio of $\omega/Q$ of the meter, is constant throughout the fluid flow rate operating range, the slip may be corrected once and for all by direct calibration of the meter register. With conventional turbine meters prior to this invention, however, the metering-rotor slip and, consequently, the true or actual meter ratio of $\omega/Q$ are found to vary both with fluid flow rate and fluid viscosity or, briefly, with the Reynold's number of the fluid. These variations which are characteristic of conventional turbine meters may be graphically illustrated by plotting a curve in which the meter registration ratio $\omega/Q$ is the ordinate and fluid flow rate is the abscissa. Such curves are known as accuracy, registration or calibration curves and are treated in detail in said copending application Serial No. 795,755.

With conventional turbine meters, the accuracy curve rises sharply in the region of laminar flow rates and reaches a peak at the critical Reynold's number of the fluid being metered. From this peak, where the nature of the fluid flowing through the meter begins to transform generally into a turbulent flow condition, the curve at first falls sharply in the transition flow range, and then slopes more gradually in the turbulent flow range. Owing to these objectionable variations, no direct register calibration or other correction can be made that will be satisfactory for all flow rates in an operating range which particularly includes low turbulent and transition flow rates. As a result, performance of prior art turbine meters for providing highly accurate fluid flow measurements is unacceptable, especially at low flow rates.

Accordingly, it is the major object of the present invention to provide a novel turbine meter in which variations in the meter registration ratio of metering rotor speed to fluid flow rate are substantially eliminated over a wide meter operating flow rate range. This is accomplished, in accordance with the present invention, by providing a novel device, hereinafter referred to as a turbulent seal device. The turbulent seal device of the invention essentially comprises a properly proportioned inwardly opening annular recess peripherally surrounding a radially bladed turbine metering rotor and formed in a fluid guide structure defining a fluid flow channel of annular cross-section for guiding fluid through the rotor blades. This turbulent seal device imposes a variable fluid drag on the metering rotor and has the effect of eliminating fluid leakage through the blade tip clearance to improve the flatness of the accuracy curve and thereby approach the ideal condition of a constant registration ratio of $\omega/Q$. It was discovered in this invention that the objectionable accuracy curve hump is flattened out by imposing the variable turbulent seal drag on the metering-rotor, and that the tail of the curve in the turbulent flow range is raised to eliminate the objectionable downward slope by preventing leakage through the blade tip clearance. As a result, the flatness of the meter accuracy curve is improved over a wide range of fluid flow rates to permit direct and accurate calibration of the meter register.

Thus, a more specific object of the present invention is to provide a turbine meter with a novel device which imposes a variable fluid drag on the metering-rotor to improve the flatness of the meter accuracy or registration curve.

Still another specific object of the present invention is to provide a novel turbine meter in which a longitudinal fluid flow channel of uninterrupted annular cross-section has an inwardly opening annular recess circumferentially surrounding the turbine metering-rotor and cooperating to eliminate leakage of fluid through blade tip clearance.

Still another object of the present invention is to provide a turbine meter with a novel turbulent seal device which is increasingly effective to eliminate variations in metering-rotor slip as the fluid flow rate is reduced toward the critical Reynolds number of the fluid being metered.

FIGURE 2 is a sectional view of the meter in FIGURE 1 taken substantially along the line 2—2 of FIGURE 1;

FIGURE 8 is substantially diametral sectional view of the turbine rotor of the meter of FIGURE 1;

FIGURE 10 is a top plan view of the blade of FIGURE 9;

FIGURE 11 is a development of a fragmentary cylindrical section of the tips of the blades of the rotor of FIGURE 8;

FIGURE 12 is a development of a fragmentary cylindrical section at the roots of the blades of the rotor of FIGURE 8;

FIGURE 20 is a developed section taken substantially along lines 20—20 of FIGURE 5 and illustrating the laminar fluid flow pattern circumferentially flowing in the turbulent seal device recess;

FIGURE 22 is a section similar to FIGURE 20 but illustrating the turbulent flow pattern of the fluid circumferentially flowing in the turbulent seal device recess;

FIGURE 24 is an enlarged fragmentary section similar to that of FIGURE 5 but showing a modified form of the invention in which the blades are flush with the turbulent seal device recess.

Figure 1:
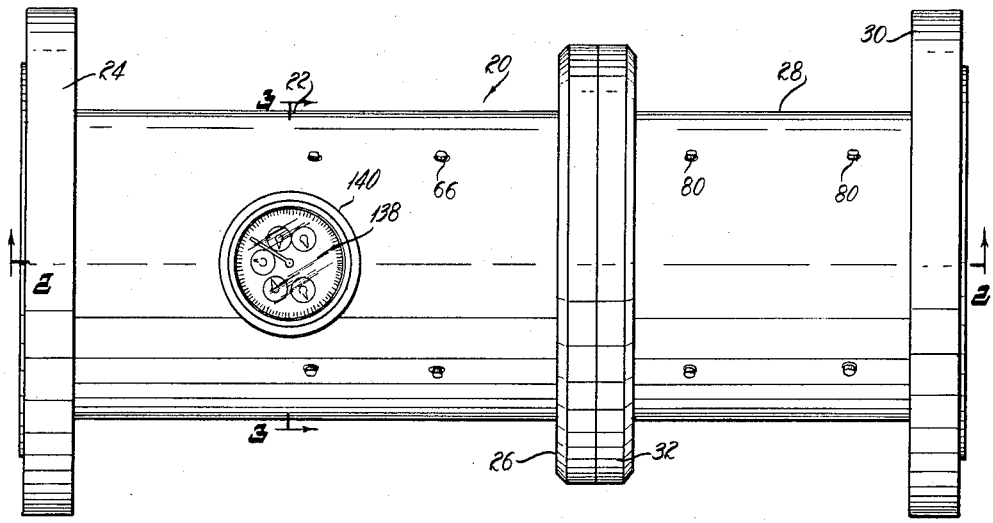
FIGURE 1 is a top plan view of a turbine fluid meter embodying the principles of the present invention, and primarily adapted for metering gases.
Figure 3:
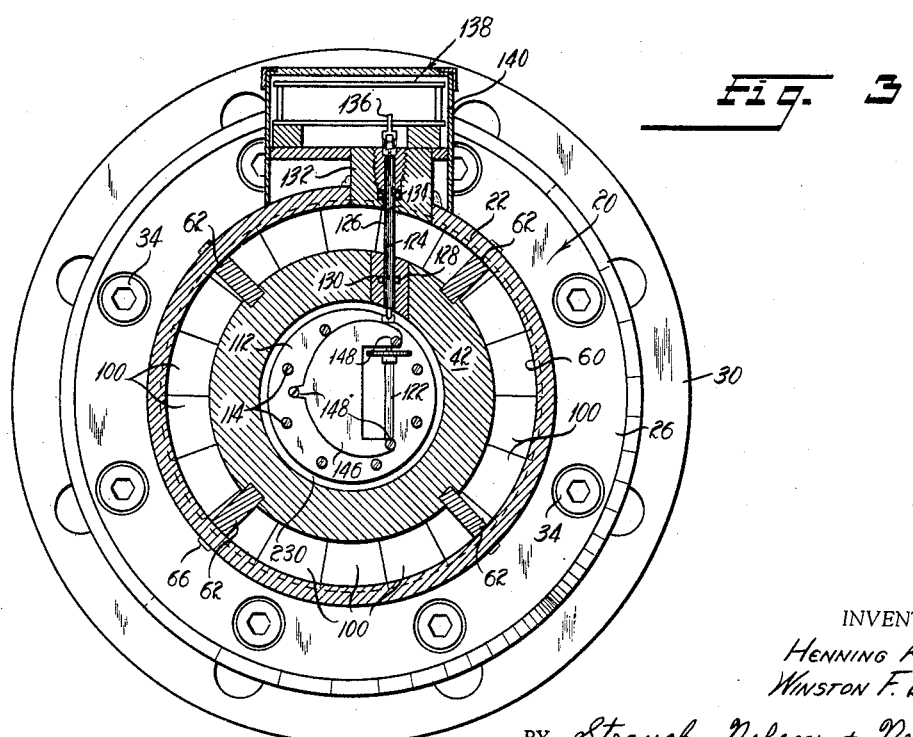
FIGURE 3 is a sectional view taken substantially along the line 3—3 of FIGURE 2.

FIGURES 1 to 14 illustrate a turbine meter constituting a practical embodiment of the principles of the present invention for use in metering all fluids and particularly adapted in certain aspects for use in metering gases. Referring to FIGURES 1, 2, and 3, the turbine meter 20 is provided with a separable two-part housing comprising a first tubular inlet section 22 having an attachment pipe flange 24 welded to its outer end, and a coupling flange 26 welded thereto at its inner end, a second tubular outlet member 28 of equal diameter to tubular member 22 and coaxially aligned therewith and having a pipe attachment flange 30 welded to its outer end and a flange 32 welded to its inner end and in abutment with the flange 26 of member 22. As is clearly illustrated in FIGURE 2, the flanges 26 and 32 are piloted together in axial alignment and rigidly connected by equiangularly disposed screws 34. Fluid tight relationship between flanges 26 and 32 is maintained by an O-ring type sealing element 36 retained and compressed in an annular recess in the face of flange 26 abutting flange 32. The internal diameter of tubular members 22 and 28 is preferably equal to that of the conduit in which the meter 20 is interposed for fluid flow measuring purposes.

A suitably faired two-part core structure, consisting of an upstream unit 38 and a downstream unit 40, is mounted within the tubular members 22 and 28, respectively, in coaxial alignment therewith and houses the fluid metering structure and register drive mechanism. Core structure units 38 and 40 coact with the inner walls of members 22 and 28 to form a venturi of hollow form (constructed in accordance with the principles hereinafter set forth in detail) between the inlet end of meter 20 at flange 24 and the outlet end thereof at flange 30.

Core unit 38 comprises a hollow body member 42 having an end recess 44 reeciving a bearing support 46 in axial alignment therewith and fixed thereto by screws 48, a plate 50 rigidly secured at the opposite end of member 42 by screws 52 and a nose piece 54 rigidly mounted upon the plate 50 by a stud bolt 56. The exterior surface 58 of the nose piece 54 is of suitable diverging cross-section in the direction of flow to convert the flow of gas or other fluid being metered from the cylindrical stream of the conduit being metered into an annular stream in the annular channel 60 defined between the exterior cylindrical surface of core member 42 and the interior cylindrical surface of housing member 22 constituting the venturi throat. Core unit 38 is coaxially supported within the tubular member 22 by radially extending ribs 62 which are equiangularly spaced about the common axis of the core unit 38 and tubular member 22 and which are rigidly connected to core member 42 by screws 64 and rigidly fixed to tubular member 22 by screws 66. Ribs 62 are faired at their opposite ends to minimize the turbulence in the stream resulting therefrom and are of such axial length as to eliminate any tangential component of the velocity of the fluid stream so that as the stream approaches the end of member 22, it has substantially pure axial flow.

The downstream core unit 40 is formed by a hollow member 68, the exterior surface 70 of which converges in the direction of fluid flow from a cylindrical portion 72 coaxial with and of equal diameter to the exterior surface of the member 42 to a tip 74 and is of suitable curvature to restore the pattern of fluid flow from the annular channel 60 to the cylindrical channel of the downstream pipe with minimum turbulence and maximum head loss. Member 68 is coaxially supported within the tubular member 28 by equiangularly spaced pairs of studs 76 and 78 which are threaded into the member 68 and by screws 80 which extend through the wall of the tubular member 28 and are threaded into the ends of the studs 76 and 78. A plate 82, apertured at 84, is mounted upon the end of member 68 adjacent the core unit 28 and supports a thrust bearing retainer 86.

The meter rotor assembly 88 consists of a shaft 90 formed of magnetic material journalled upon the member 46 by spaced radial bearings 92 and 94 and magnetically suspended by a predemagnetized permanent horseshoe magnet 96 mounted in the member 46 above the shaft 90, a spoked rotor wheel 98 terminating in equiangularly spaced turbine blades 100 at the periphery thereof disposed within and extending across the annular channel 60, and a permanent magnet type magnetic drive coupling driving element 102 fixed to the opposite end of shaft 90 exteriorly of the bearing 92. Bearings 92 are "olived" ring sapphire radial bearings. The main function is to define the radial position of the rotor 88. They carry very little load since the weight of the rotor is supported by the magnetic suspension force of magnet 96 and the rotor is very well balanced. The small axial movement of the rotor 88 and shaft 90 (0.010 to 0.015 in.) during starting and stopping of the meter makes radial bearings 92 and 94 self-cleaning. The resultant magnetic force of magnet 96 is of such magnitude as to counterbalance the weight of the rotor assembly 88, its line of action being through the center of gravity of assembly 88. The total weight of assembly 88 in one practical embodiment of the invention is 0.16 lb. and its moment of inertia is 0.50 lb.-n². The permanent magnet 96 is properly predemagnetized to such an extent that it will retain its residual magnetization indefinitely after it is installed in the turbine assembly. There should be sufficient gap (0.1 in. approximately in that practical embodiment) between the magnet 96 and shaft 90 so that unavoidable radial play of shaft 90 in bearings 92 and 94 does not change the magnetic force appreciably.

Figure 7:
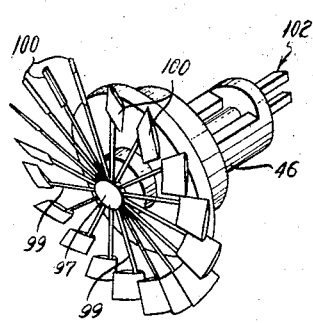
FIGURE 7 is a perspective view of the turbine rotor and support structure therefor of the meter of FIGURE 1.
Figure 9:
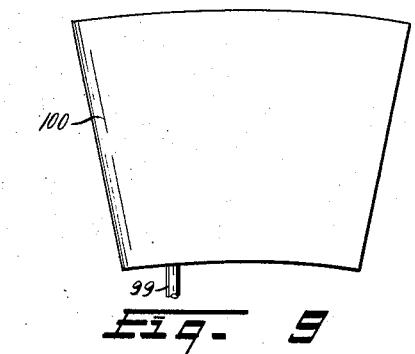
FIGURE 9 is a side elevational view of one of the blades of the rotor of FIGURE 8.

The turbine wheel 98 of the rotor 88 is disposed between the adjacent ends of core units 38 and 40 at the juncture of flanges 26 and 32 on housing members 22 and 28 is readily accessible for servicing by removal of the tubular member 28 together with the core unit 40 mounted therein after detachment of the flanges 26 and 32. With the tubular member 28 and core unit 40 thus removed, the entire rotor assembly can be removed as a unit by removing screws 48 to detach the bearing support 46 from the core member 42. This sub-assembly is shown in FIGURE 7.

As the turbine meter shown in FIGURE 2 is basically designed for gas measurement, the structure of the turbine wheel 98 has the form similar to that shown in detail in FIGURES 4 to 12. It comprises a small hub 97 fixed to the end of shaft 90, having a plurality (eighteen in the disclosed embodiment) of spokes 99 projecting therefrom and each supporting one of a like plurality of blades 100. The blades 100 are of hollow construction formed of thin sheet material formed to the contours illustrated in FIGURES 9 to 12. Blades 100 are straight symmetrical low drag air foils with zero overlap (resulting in a solidity=1.21). The chords form an angle of 55.5° with the rotor axis in the illustrated embodiment. If slightly higher starting flow is acceptable, the profiled air foils may be replaced by straight flat plates in order to reduce cost.

Figure 4:
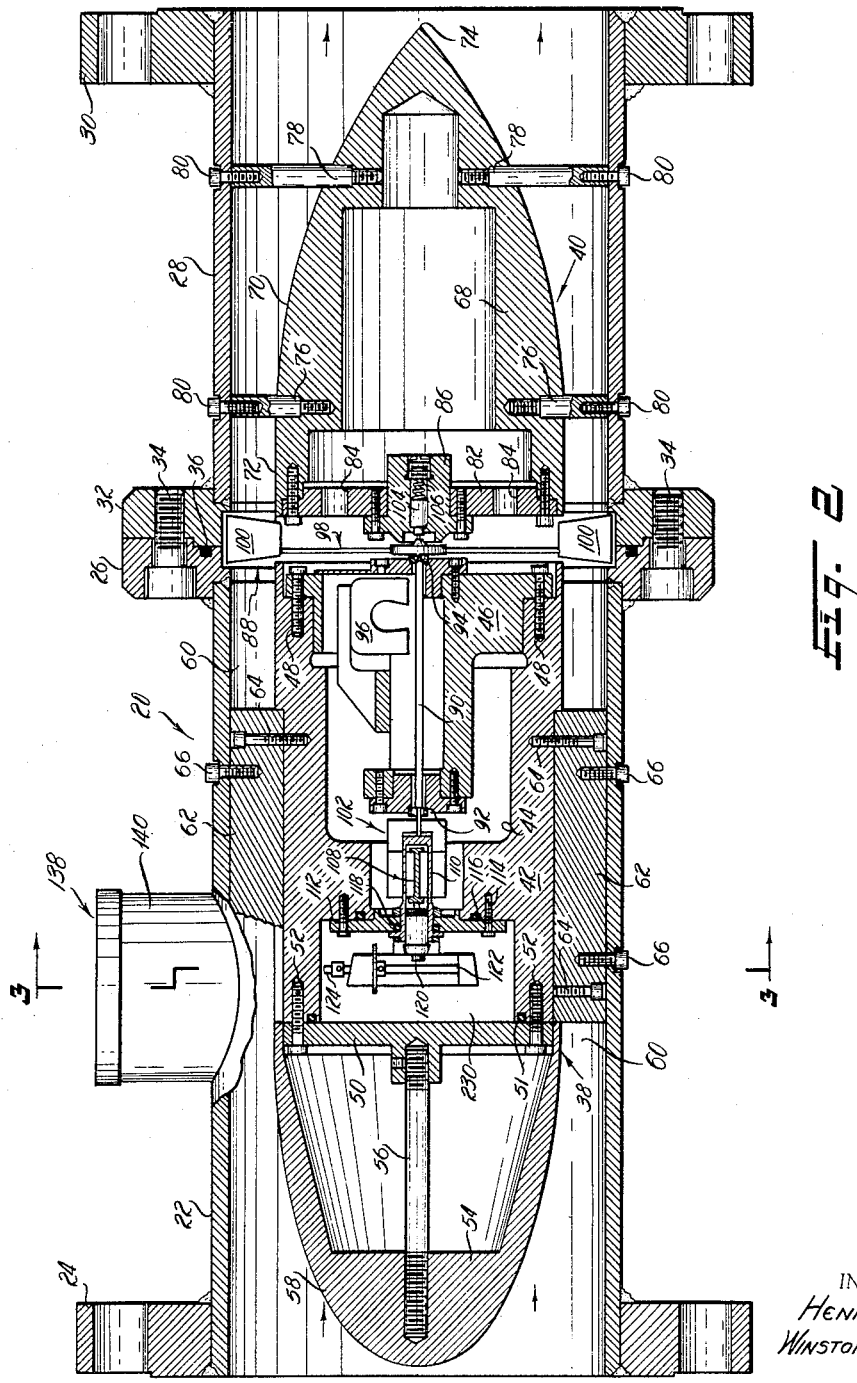
FIGURE 4 is an enlarged fragmentary sectional view illustrating the turbine rotor of the meter of FIGURE 1.

Referring to FIGURE 4, thrust force of the rotor 88 is absorbed by a sapphire thrust bearing mounted on plug 104 which is resiliently backed by a compression spring 106 and mounted in the member 86 of the core unit 40 in axial alignment with the rotor assembly 88. The resilient support of this bearing prevents damage thereto during shipment. The normal thrust of the rotor 88 is very small, and about 0.14 lb. at rated capacity of 20,000 cu. ft./hr. for air at atmospheric pressure in the said illustrated practical embodiment.

Figure 5:
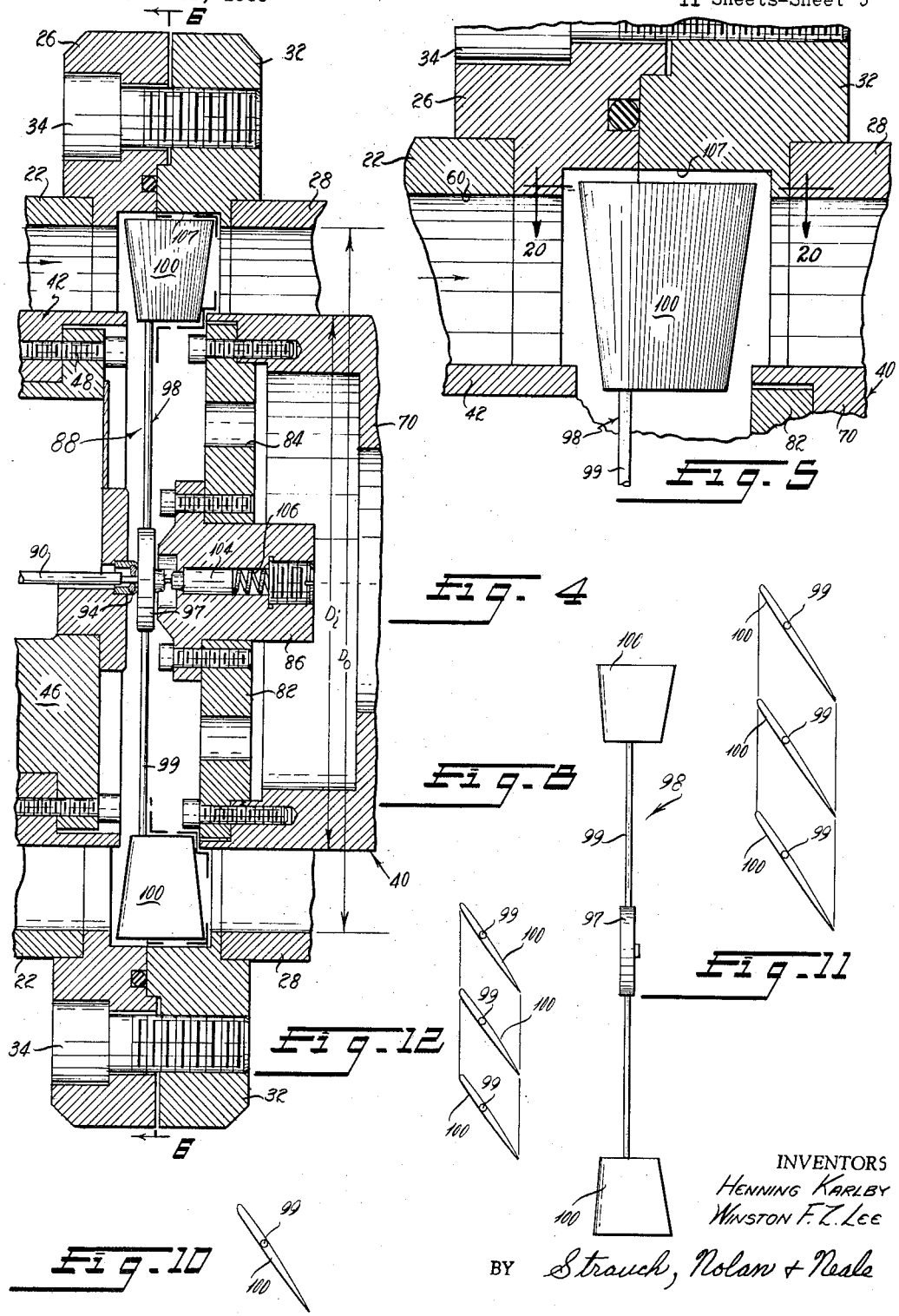
FIGURE 5 is an enlarged fragmentary sectional view illustrating the relation of the turbine rotor blades to the annular flow passage in the meter of FIGURE 1.
Figure 6:
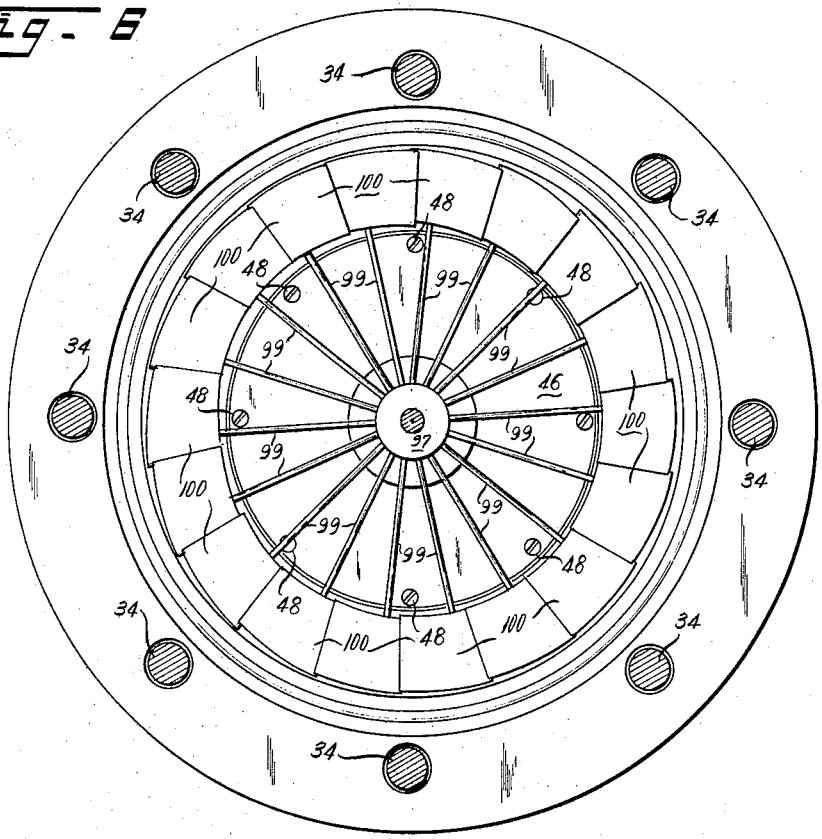
FIGURE 6 is a sectional view taken substantially along the line 6—6 of FIGURE 4.

As best shown in FIGURES 4 and 5, the turbulent seal device of the present invention comprises an inwardly opening annular recess 107 peripherally surrounding rotor 88 and formed in the outer wall of the straight flow uninterrupted, annular passage 60. In the preferred embodiment, the tips of the rotor blades 100 protrude with ample clearance radially into recess 107.

As will be presently explained in detail, the turbulent seal device of the present invention improves the flatness of the meter accuracy or registration curve. Blades 100, instead of protruding into recess 107 as shown in FIGURE 5, may terminate flush with the radial entrance to recess 107 (see FIGURE 24) so that the blade tip diameter is equal to the internal diameter $D_i$ (FIGURE 24) of the meter housing.

With the meter of this invention, the fluid entering rotor 98 has a substantially uniform velocity distribution across the annular cross-section of flow channel 60; the mean velocity of the fluid flowing through channel 60 upstream from rotor 98 also is substantially uniform and uninterrupted.

Figure 13:
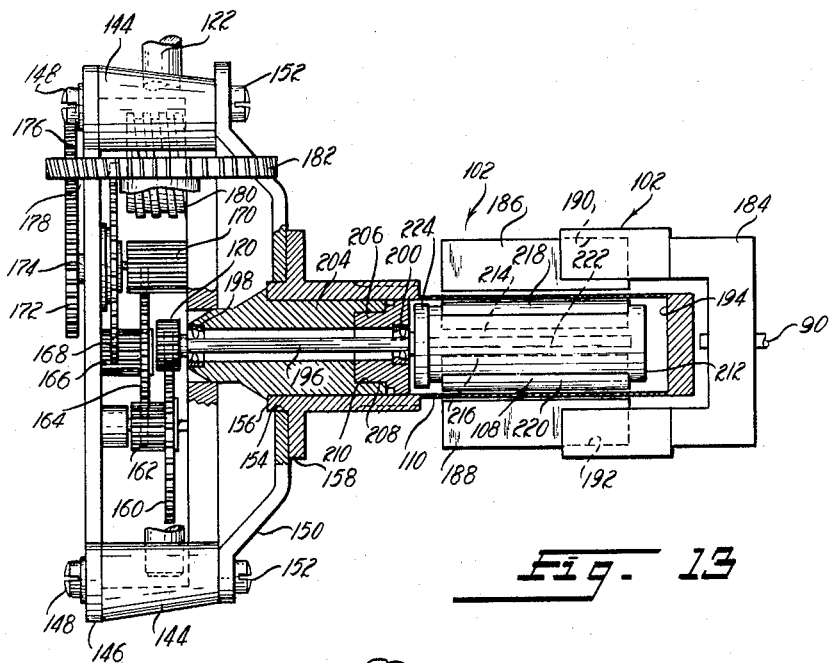
FIGURE 13 is a fragmentary longitudinal section through the register drive train and magnetic coupling of the meter of FIGURE 1.

Referring to FIGURES 2 and 13, the magnetic driving element 102 mounted on the left end of turbine rotor shaft 90 is magnetically coupled to a magnetic follower element 108 through a closed and non-magnetic tubular partition 110 forming a static fluid seal and which is mounted in fluid tight relation with the member 42 by a support plate 112 which is fixed to the member 42 by screws 114 and which is maintained in fluid tight relation therewith by a compressed O-ring 116 recessed in member 42 and with tubular partition 110 by a compressed O-ring 118 recessed in plate 112. The magnetic follower element 108 drives a pinion 120 which through a suitable gear train, as shown in FIGURES 2 and 3, is coupled to a vertically extending shaft 122 which is coaxially aligned with and coupled to a register drive shaft 124. Register drive shaft 124 (FIGURE 3) extends through a fixed tubular housing 126. Housing 126 extends through the annular channel 60 between members 22 and 42, being fixed to member 42 by an insert plug 128 which, in assembly, becomes substantially an integral part of member 42. Static fluid tight relation between housing 126 and plug 128 is established by an O-ring 130; housing 126 is mounted on member 22 by an insert member 132 welded to member 22. O-ring 134 forms a static fluid tight seal between housing 126 and insert 132.

The shaft 124 is coupled to an input shaft 136 of a conventional dial type indicator 138 (FIGURES 1 and 3) which is mounted upon the top of the meter 20 within an upstanding tubular housing 140 rigidly fixed in substantial radial relation to the exterior of the tubular member 22.

Figure 14:
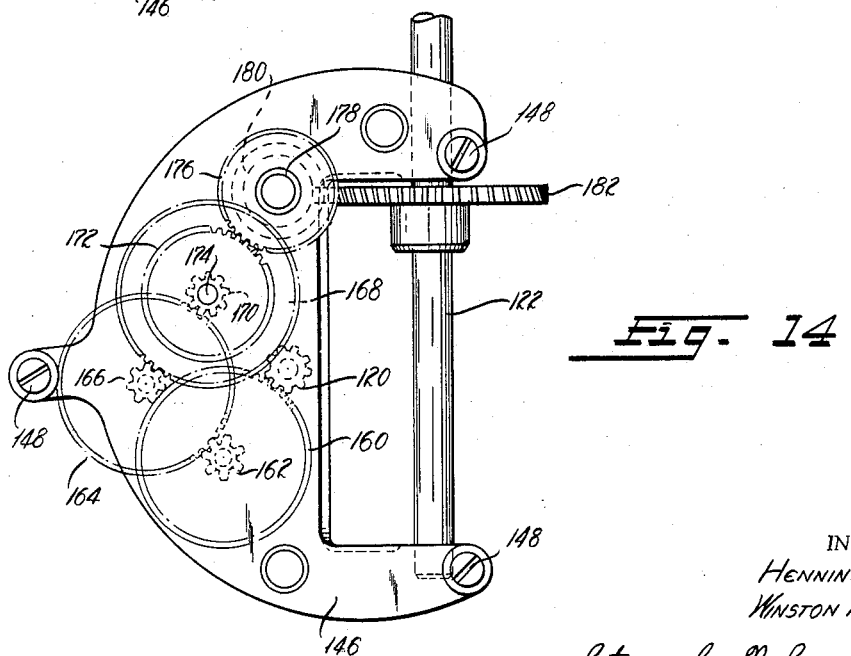
FIGURE 14 is a left end view of the assembly of FIGURE 13.

Referring now to FIGURES 13 and 14, the gear train between pinion 120 and shaft 122 is mounted on a pair of supports 144 and 146 which are rigidly connected by screws 148 and which are mounted upon the integral extension of the tubular partition 110 by a bracket 150. Bracket 150 is rigidly connected by screws 152 to the member 144 and is provided with a central aperture 154 in which is received in a piloting fit the cylindrical portion 156 of the tubular partition 110, the bracket 150 being in abutment with a radially extending flange 158 on tubular partition 110. The fit between aperture 154 and cylindrical portion 156 may either be a force fit or the elements may be braised together or otherwise fixed together to form a rigid assembly.

The gear train between pinion 120 and shaft 122 consists of a gear 160 journalled on member 144 in constant mesh with pinion 120, a pinion 162 rigidly coaxially fixed to the gear 160, a gear 164, journalled on the member 144 in constant mesh with the pinion 162, a pinion 166 rigidly coaxially fixed to the gear 164, a gear 168 journalled upon a boss 170 integral with the member 144 in constant mesh with the pinion 166, a gear 172 connected through member 146 by a shaft 174 for unitary coaxial rotation with gear 168, a gear 176 journalled on the plate 144 and 146 by a shaft 178 in constant mesh with the gear 172, a worm gear 180 fixed on the shaft 178, and a worm wheel 182 fixed on the shaft 122 and in constant mesh with the worm gear 180.

Structurally the magnetic drive coupling driving element 102 consists of a stainless steel yoke 184 coaxially fixed to the turbine rotor shaft 90 and a pair of square bar magnets 186 and 188 fixed in recesses 190 and 192 on the arms of the yoke 184 as by soft soldering. The longitudinal central axes of the square bar magnets 186 and 188 are equally spaced from the axis of the shaft 90 and parallel thereto and are disposed in equiangularly arranged surrounding relation to the tubular partition 110.

The follower magnet assembly is disposed within the closed and tubular well 194 of the tubular partition 110 and is mounted therein for coaxial rotation by a shaft 196 which is journalled in spaced bearings 198 and 200 which are supported by mating tubular bearing retainer members 204 and 206 respectively. Members 204 and 206 are maintained in coaxial alignment by the piloting engagement of the cylindrical surface 208 on member 206 with the cylindrical recess 210 in member 204 and are received in a piloting fit with the internal cylindrical wall of the tubular partition 110. Follower member 108 comprises a cylindrical plastic magnet support 212 having diametrically opposed semi-cylindrical recesses 214 and 216 cut in the periphery thereof to receive cylindrical follower magnets 218 and 220 respectively. Magnets 218 and 220 are preferably substantially coextensive in length with the driving magnets 186 and 188 and are maintained in alignment therewith along the common axis of shaft 90 and 196. The plastic magnet support 212 is fixed to the shaft 196 for rotation therewith by a pair of support pins 222 the coplanar axes of which are parallel to the axis of shaft 196 and offset from the recesses 214 and 216 and which project through apertures in the plastic magnet support 212 and which are supported at their free end by a flange 224 which is rigidly fixed coaxially to the shaft 196 to the right of the bearing 200.

As is explained fully in our said copending application, Serial No. 634,662, the relation between the driving magnets 186 and 188 and the follower magnets 218 and 220 is such that, as the shaft 90 is rotated in response to fluid flow through the turbine blades 100 of the rotor assembly 88, the follower assembly 108 will be caused to rotate either by attraction of the follower magnets 218 and 220 to the driving magnets 186 and 188 or by repulsion of the follower magnets 218 and 220 from the driving magnets 186 and 188. The repulsion type drive coupling, because of its substantially lower backload on the turbine rotor 98, is presently considered essential for accuracy in metering low density fluids such as gases. In case of large size turbine meter in metering liquids, some backload on the turbine rotor can be tolerated without appreciable effect on the meter accuracy. The attraction type drive coupling is preferred because of its higher transmission torque, higher acceleration and higher pick-up speed than the repulsion type of same size. Rotation of the follower 108 imparts rotation to the shaft 196 and the pinion 120 which is fixed to the end thereof exteriorly of the bearing 198 to impart rotation to the register drive shaft 122 through the gear train illustrated in FIGURES 13 and 14 and previously described.

From the foregoing description, it is apparent from FIGURES 2 and 3, that the plate 50, seal 51, member 42, plate 112, seals 116 and 118 and tubular partition 110 define a sealed chamber 230 which is isolated from the fluid flowing through the channel 60 by the tubular housing 126 which is provided with seals 130 and 134 the rotary motion of the follower 108 is transmitted to the register mechanism 138 exteriorly of the meter housing members 22 and 28 without the use of any dynamic fluid seals such as stuffing boxes and thus provide a fluid tight register assembly with very small mechanical friction. If further detailed information is considered to be necessary as to the detailed construction of the magnetic drive coupling, reference is hereby made to the disclosure of our said copending application Serial No. 634,662.

Figure 15:
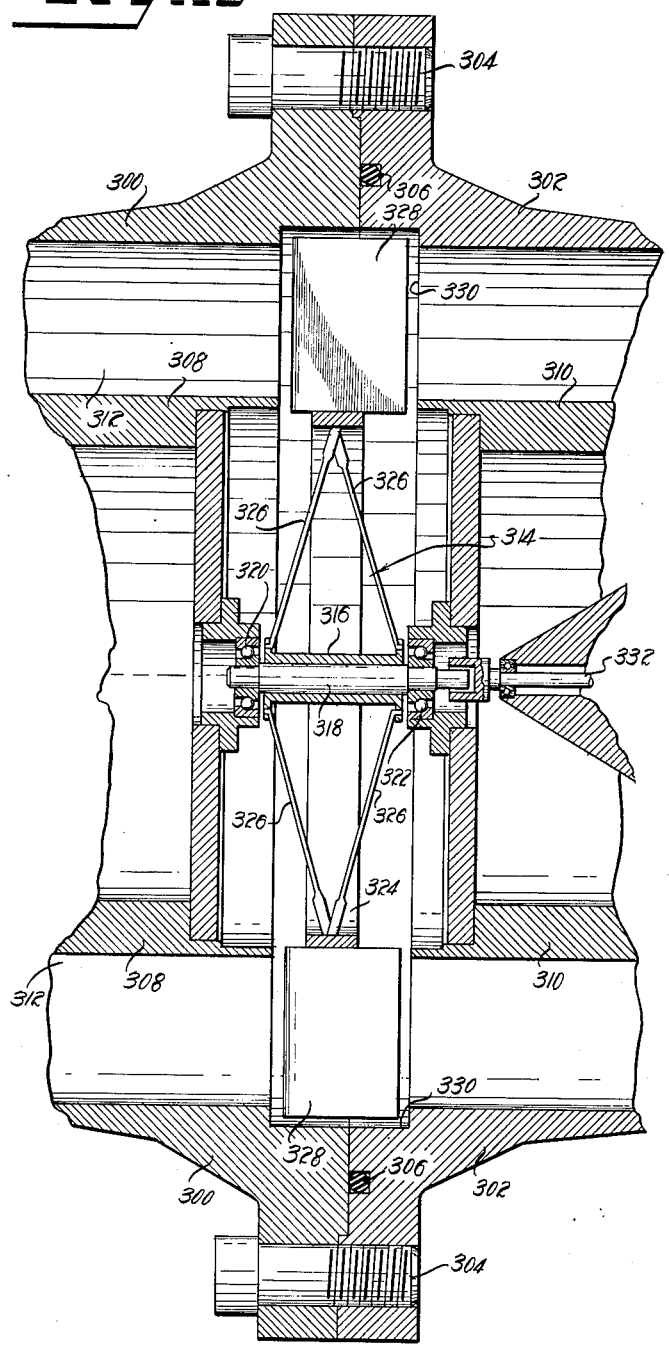
FIGURE 15 is a view similar to FIGURE 4 of an enlarged and modified form of the meter of FIGURE 1 primarily adapted for use in metering liquids.

FIGURE 15 illustrates a modified version of the turbine meter of FIGURES 1 to 14. The FIGURE 15 embodiment is particularly adapted for metering liquids and, in the actual physical embodiment, is substantially larger than the embodiment of FIGURES 1 to 14. Structurally the meters are identical with the exception of the rotor structure and mounting. The meter comprises coaxial tubular housing sections 300 and 302 fixed together by bolts 304 and maintained in fluid tight relation by a compressed O-ring 306, coaxial equal diameter core sections 308 and 310 coaxially mounted in housing sections 300 and 302 respectively to define an annular channel 312 forming the throat of a venturi of hollow form, and a turbine rotor 314 interposed between the opposed ends of core section 308 and 310.

The turbine rotor 314 comprises a central hub 316 fixed to a shaft 318 which is journalled at its opposite ends by opposed ball thrust type anti-friction bearings 320 and 322 carried coaxially by core sections 308 and 310 respectively an annular rim 324 supported from hub 316 by a plurality of spokes 326 arranged substantially in the same manner as the wire spokes of a bicycle wheel, and a plurality of equiangularly disposed blades 328 mounted on the exterior of the rim 324 to extend transversely across the passage 312, the tips thereof projecting into an annular recess 330 of a turbulent seal device as in the first embodiment.

In a theoretically perfect turbine meter where all the fluid is passed through the metering-rotor and where no resisting torques are encountered in the passage of fluid through the metering-rotor, the metering-rotor moves in exact timed relation to the fluid flow, and no force is required to drive it. Under these conditions, the meter registration ratio of metering-rotor angular velocity to fluid flow rate ($\omega/Q$) is ideal and constant as indicated by the straight horizontal line 350 in FIGURE 18.

Under actual conditions, however, there are resisting forces of such nature and magnitude to cause a significant and variable turbine rotor slip, thereby affecting the accuracy of the meter unless compensated for. These resisting forces conveniently may be considered to be of two classes; resistance force $F_m$ due to mechanical resistance of the friction created by the bearing loads and the meter register load, and the resistance force $F_f$ created by fluid friction acting on the rotating rotor.

These forces combine to provide a total resistance force $F_r$, or $$F_r = F_m + F_f \qquad (1)$$

The total force, $F_r$, which is relatively small as opposed to that encountered in a power turbine, is required to be overcome by a driving force $F_d$ applied by the fluid passing through the blades of the metering-rotor. Thus, when the turbine meter of FIGURE 1 is steadily rotated in synchronous condition, the fluid driving force, $F_d$, will equal the total resisting force $F_r$, or $$F_d = F_r = F_m + F_f \qquad (2)$$

As a result of the resisting force, the rotor will slip and will turn at a speed somewhat less than synchronous ideal speed. This relationship of rotor slip and resisting force is treated in our copending application Serial No. 795,755 to which reference is made in the event further details are needed for a complete understanding of this invention.

Figure 16:
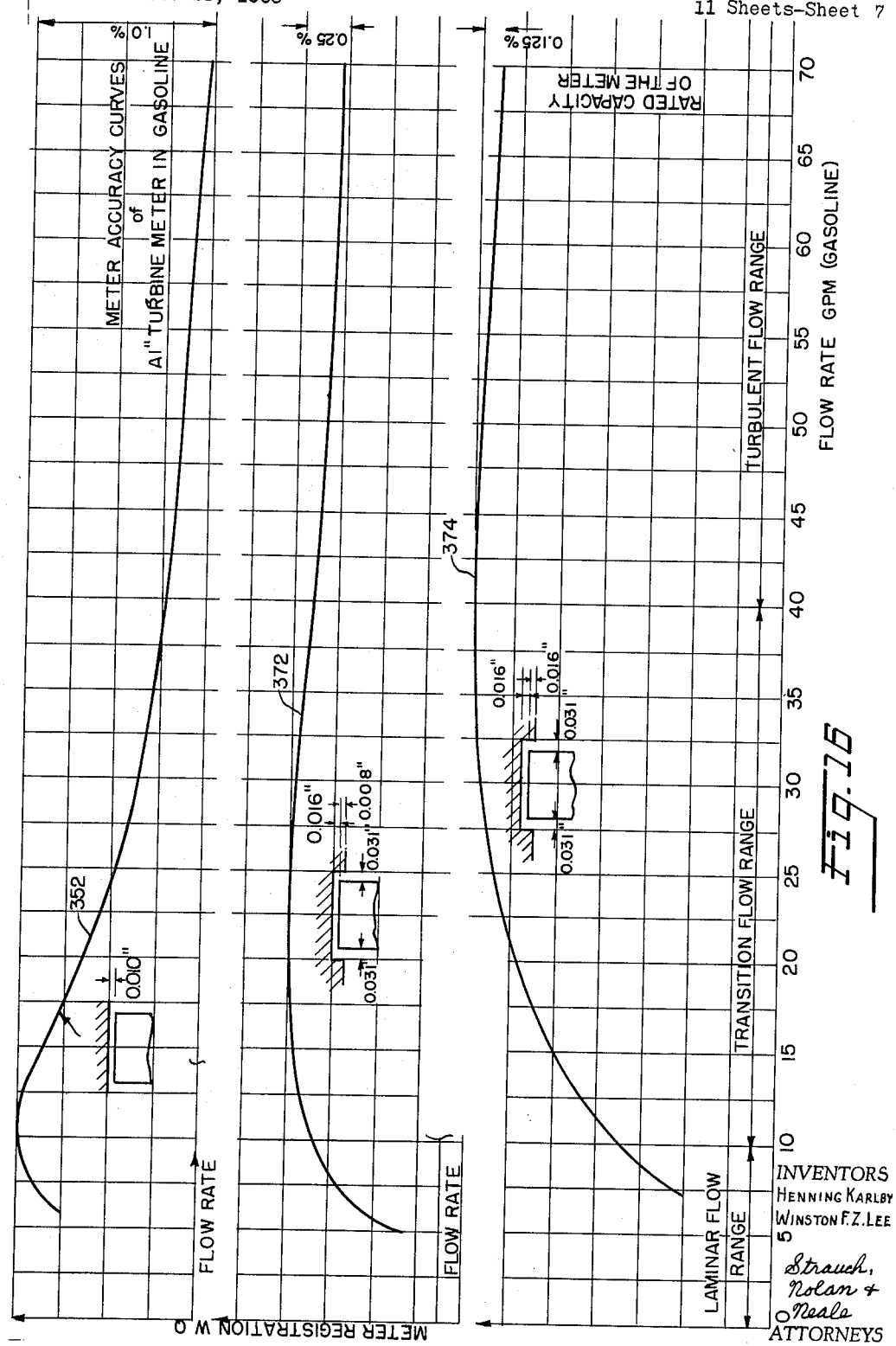
FIGURE 16 illustrates plots of three accuracy or registration meter curves obtained from actual data for a one-inch turbine meter in gasoline, the top curve being for the meter without the turbulent seal device of the present invention, and the remaining curves being for the meter incorporating the present invention.

Extensive tests demonstrate that for conventional turbine meters prior to the present invention, rotor slip is not constant for laminar, transition, and turbulent fluid flow rates, but rather varies considerably to provide a meter accuracy or calibration curve indicated at 352 in FIGURE 16. Curve 352 is for turbine meter constructed in the same manner as the turbine meter of FIGURE 1 except that annular recess 107 (see FIGURE 4), has been omitted and the diameter of the internal surface of the meter housing has been made uniform with a blade tip clearance of 0.010 inch. Gasoline was metered to obtain the values for plotting curve 352.

As shown in FIGURE 16, curve 352 rises sharply in the region of laminar flow and reaches a peak around the critical Reynolds number. From this peak, curve 352 first falls sharply, forming a hump, and then more gradually as it enters the turbulent flow range. Thus, where it is desirable to extend the operating range of the meter not only throughout the uppermost part of the turbulent flow range, but also through the lower part of the turbulent flow range and well into the transition flow range, a meter having characteristics represented by accuracy curve 352 is not acceptable, if accurate flow measurements are to be obtained. Such an expanded meter operating range including the transition flow range as well as the turbulent flow range, however, is needed for turbine meters of small size, for metering thick fluids, or to meet process requirements. Expanded operating ranges are needed for small size meters or for metering viscous fluids particularly because the Reynolds number depends on both the geometry of the meter and the viscosity of the fluid being metered.

It was found that the gradually downward slope of the meter accuracy curve 352 in the high turbulent flow range was the result of fluid leakage through the tip clearance between the rotor blades and the internal fluid guide surface of the meter housing. It was also found that the degree of this downward slope could be controlled by varying the amount of the blade of the blade tip clearance. To demonstrate this, a four-inch Biram Anemometer was converted into a turbine flow meter without the turbulent seal of the invention and tested in air. The following results were obtained and plotted in FIGURE 17.

Figure 17:
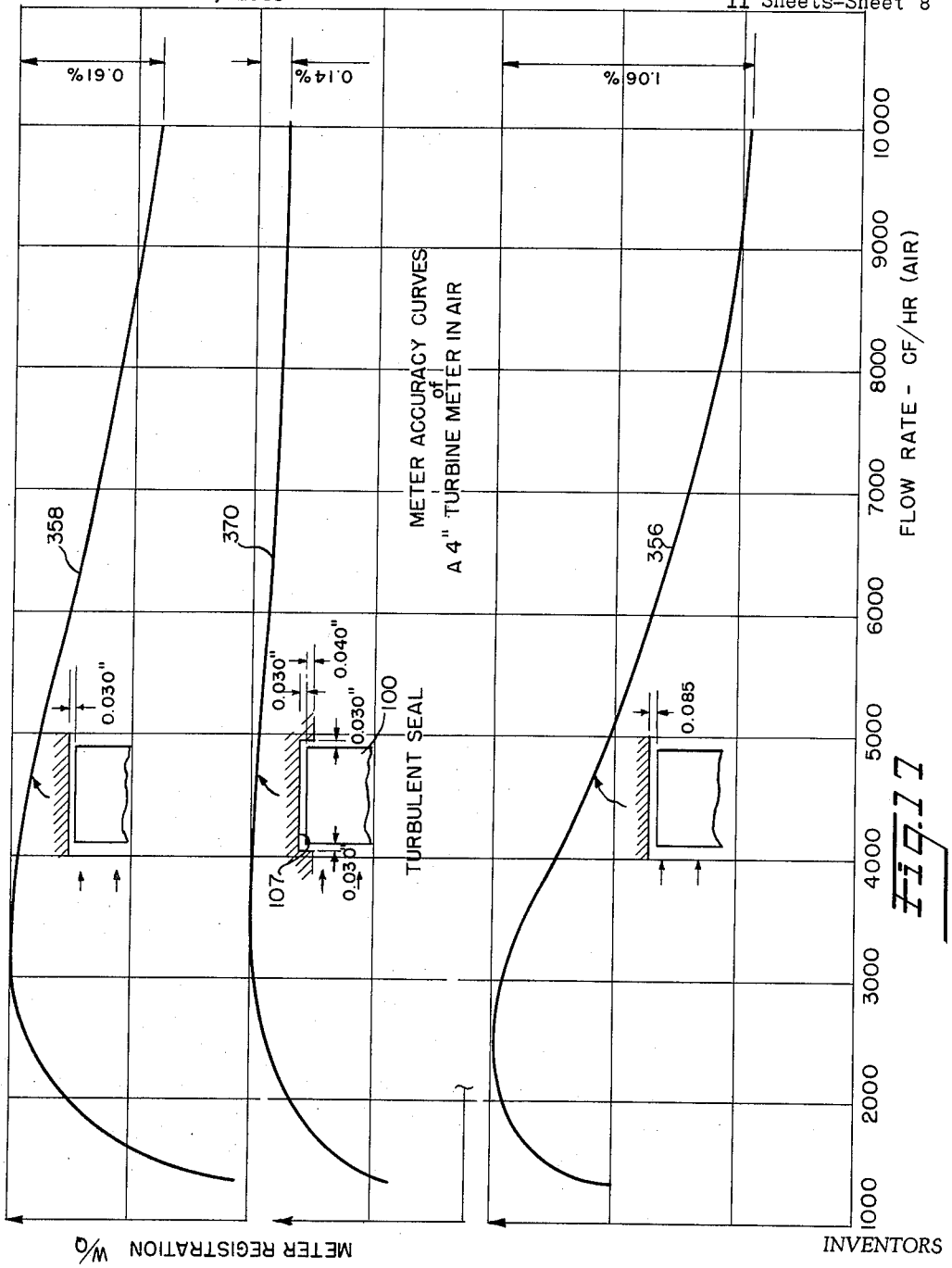
FIGURE 17 illustrates plots of three accuracy or registration curves obtained from actual data for a four-inch turbine meter in air, the top and bottom curves being for the meter without the turbulent seal device of the present invention, and the remaining middle curve being for the meter with the turbulent seal.

When a relatively large clearance of 0.085 inch was provided between the blade tips and the meter housing, an accuracy curve 356 was obtained. Curve 356, as shown in FIGURE 17, drops 1.06 percent from its highest registration point at the peak of the hump as the flow rate increase. When the tip clearance was reduced to 0.030 inch, however, an accuracy curve 358 having a downward slope of 0.61 percent was obtained. Thus, decreasing the tip clearance, decreases the fluid leakage through the blade tip clearance and decreases the downward slope as seen from curves 352, 356 and 358.

For zero or very small tip clearance without the turbulent seal device of the invention, an accuracy curve 360 (FIGURE 18) is obtained. Curve 360, while having a straight line portion 362 in the turbulent flow rate, still retains an objectionable hump 364 which is characteristic of prior art turbine meters and which prevents the use of such meters as high-accuracy measurement devices for flow rates in the transition flow range. Consequently, it is evident that even with zero or very small rotor blade tip clearance, objectionable variations in rotor slip or meter registration ratio of $\omega/Q$ will occur in the laminar and transition flow range.

Reduction of blade tip clearance, while improving meter performance to some extent, is disadvantageous for several reasons. To begin with, it is not physically possible to obtain a zero blade tip clearance owing to the fact that the rotor blades will scrape the meter housing. Second, a small blade tip clearance requires correspondingly small manufacturing tolerances which abnormally increase the cost of making the meter. Third, a small blade tip clearance is more susceptible to jamming due to foreign particles in the fluids to be metered.

With the turbulent seal device of the present invention, the fluid flowing through passage 60 will not deviate into recess 107 owing to its inertia particularly in the turbulent flow range. Similarly, the inertia of the fluid flowing through passage 60 prevents it from passing radially inwardly of blades 100 in the space between cores 38 and 40. Consequently, fluid will flow through passage 60 in an annular substantially circumferentially uninterrupted stream having inner and outer cylindrical boundaries of predetermined uniform diameter and axial lengths and disposed coaxial with the rotational axis of rotor 98. This outer cylindrical boundary, it is clear, is respectively substantially equal to or less than the tip diameter of blades 100. Similarly, the inner cylindrical boundary of the annular stream is at least equal to or greater than the root diameter of blades 100. Thus, the fluid flowing through passage 60 is prevented from deviating from a continuous stream radially inwardly or outwardly of rotor blades 100.

The turbulent seal device of this invention affords an unusually large blade tip clearance as well preventing leakage radially outwardly of the blades 100. This eliminates potential trouble due to entrained particles in the fluid being metered, and obviates the need for close manufacturing tolerances in the component parts of the meter.

To demonstrate the effectiveness of the turbulent seal device of this invention, the converted four-inch Biram turbine meter, following the tests results for plotting curves 356 and 358, was provided with an annular turbulent seal recess construction having the following dimensions: a recess side blade clearance of 0.030 inch on each side of the rotor, a recess depth of 0.070 inch, and a blade protrusion of 0.040 inch to provide a radial blade tip clearance of 0.030 inch. With this turbulent seal recess construction, an accuracy curve 370 was obtained. The deviation of accuracy curve 370 was from its maximum found to be only 0.14 percent in comparison was 0.61 percent for curve 358.

To demonstrate the comparative effectivess of the turbulent seal device in gasoline, an accuracy curve 372, in FIGURE 16, was plotted for a one-inch turbine meter constructed in accordance with this invention. In the turbulent seal recess construction for obtaining curve 372, the following dimensions were employed: a recess depth of 0.024 inch, a blade protrusion of 0.008 inch to provide a 0.016 inch radial blade tip clearance, and a 0.031 inch clearance on both sides of the rotor blades. From a comparison of curves 352 and 372, it is evident that although the blade tip clearance was significantly increased in the meter containing the turbulent recess seal device of the invention, the downward slope is decreased from 1.0 percent for curve 352 without the turbulent seal recess to 0.25 percent for curve 372 with the turbulent seal recess. By increasing the blade protrusion from 0.008 inch to 0.016 inch, an accuracy curve 374 plotted from actual data is obtained. The downward slope of curve 374 is further reduced to 0.125 percent.

Figure 18:
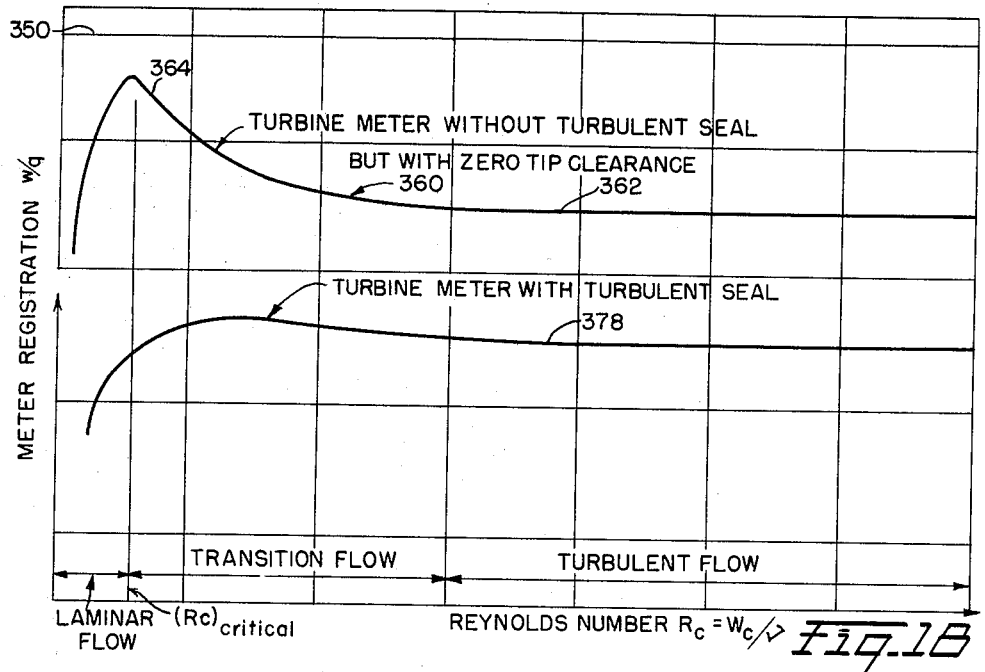
FIGURE 18 illustrates plots of three accuracy or registration curves wherein the top accuracy curve is for an ideal or theoretically perfect turbine meter, the lowest curve is for a turbine meter constructed in accordance with the embodiment of FIGURE 1, and the third curve is for a turbine meter constructed without the turbulent seal of the present invention, but with a zero blade tip clearance.

Referring to FIGURE 18, an accuracy curve 378 for a meter constructed according to the present invention is extended over a wider flow rate range in comparison with the accuracy curves shown in FIGURES 16 and 17. As compared with curve 360 obtained from a meter without the turbulent seal device but with zero blade tip clearance, curve 378 contains substantially no hump in the region of the critical Reynolds number. From actual test data, curves 370, 372, and 374 in comparison with the unimproved meter curves 352, 356, and 358 level off after a sharp rise in the laminar flow region, and extend at a substantially constant value of $\omega/Q$ into the turbulent flow range. Thus, it is evident that the flow range in which the tubulent seal device of the invention provides for a substantially constant registration ratio, $\omega/Q$ is appreciably expanded over that of turbine meters, without the instant invention, permitting accurate measurement particularly at low values of Reynolds number. The uniform difference between the ideal registration and the actual constant registration ratio obtainable with the turbulent seal device of the present invention may be compensated for by a direct and single calibration of the meter register.

Referring to FIGURE 16, a comparison of curves 372 and 374 reveals that these curves in the turbulent flow range are practically parallel to each other. The test data obtained for plotting these curves establishes that the increase in blade protrusion into the turbulent seal recess decreases the meter registration by a uniform value of 3.5 percent independently of the fluid flow rate as long as the flow rate is in the turbulent flow range. However, in the transition flow range, curves 372 and 374 are no longer parallel. A study of the test results used for plotting curves 372 and 374 reveals that the objectionable hump existant in accuracy curves for unimproved turbine meters without the turbulent seal of this invention can be lowered by different amounts by employing turbulent seals of different proportions and by varying the distance of blade protrusion into the recess. Thus, a turbulent seal of such proportions can be determined to produce an optimum improvement in the accuracy of the meter.

The elimination of variations in the meter registration ratio $\omega/Q$ and, more particularly, the elimination of the hump in unimproved turbine meters accuracy curves is probably best explained by first determining the cause of the hump in accuracy curve 360 which is plotted by calculating values of the meters registration ratio, $\omega/Q$. It can be established that when the rotor slip due to mechanical friction is negligibly small, the meter registration of a turbine meter without the turbulent seal device of this invention, but having a zero or very small blade tip clearance, can be expressed as follows:

Meter registration ratio $(\omega/Q)$ = (meter registration without any rotor slip) − (rotor slip due to skin friction drag on rotor blades)

$$= K_1 - K_2 C_f \qquad (3)$$

Figure 19:
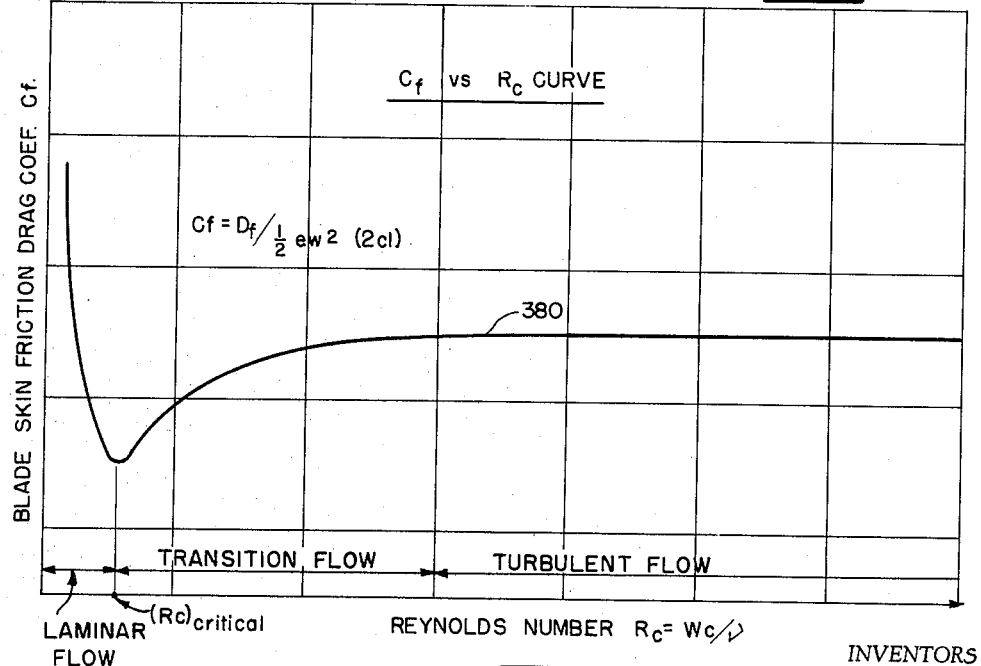
FIGURE 19 illustrates a curve obtained by plotting the blade skin friction drag coefficient $C_s$ against Reynolds number.

Where
$\omega$ = angular speed of the turbine rotor
$Q$ = flow rate
$K_1$, $K_2$ = constants, determined entirely by the geometry of the turbine rotor and flow passage of the meter
$C_f$ = a dimensionless coefficient called "blade skin friction drag coefficient," and defined as
$C_f = D_f/(\frac{1}{2}\rho W^2)(2cl)$ Where $D_f$ = Skin friction drag force on one blade of the rotor
$\rho$ = mass density of the fluid
$W$ = average fluid velocity relative to rotor blade
$c$ = blade chord (see FIG. 3)
$l$ = blade radial length
$C_f$ as a function of the Reynolds number is shown in FIG. 19.

The blade skin drag coefficient $C_f$ for skin friction drag $D_f$ on a thin symmetrical blade with a small angle of attack in a properly designed turbine meter varies with the fluid flow pattern through the rotor blading throughout the laminar, transition and turbulent flow ranges. By ploting $C_f$ against Reynolds number $R_c$, a curve 380 is obtained as shown in FIGURE 19. The Reynolds number $R_c$ is the Reynolds number based on blade chord $c$ so that $R_c = Wc/\nu$ where $\nu$ is the kinematic viscosity of the fluid passing through the meter.

From curve 380 in FIGURE 19, it is seen that $C_f$ is almost constant at high Reynolds number in the turbulent flow range for an unimproved turbine meter with no or very small blade tip clearance. At low blade Reynolds numbers below the turbulent flow range, curve 380 has a valley containing a minimum value of $C_f$ at the critical Reynolds number.

From curve 380 the meter registration ratio $\omega/Q$ can be readily calculated from Equation 3 and the resulting values of $\omega/Q$ may be plotted to obtain curve 360 in FIGURE 18. Thus, the characteristic, objectionable hump in the accuracy curve 360 for a turbine meter without the turbulent seal device of the instant invention, is essentially attributable to the variation in blade drag coefficient $C_f$ indicated in curve 380.

With the turbulent seal device of the present invention, fluid in recess 107, as previously mentioned, has a significant effect on the meter accuracy curve in that it imposes a variable drag on the metering rotor. Essentially, the total drag force induced by the turbulent seal device on the tips of rotor blades 100 causes an additional rotor slip to lower the meter registration and provide a resultant accuracy curve 378 in FIGURE 18.

This effect of the turbulent seal device is demonstrated by the equation for determining the meter registration ratio $\omega/Q$ to plot curve 378:

Meter registration ratio $(\omega/Q)$ = (meter registration without any rotor slip) − (rotor slip due to skin friction drag on rotor blades) − (rotor slip due to turbulent seal drag)

$$= K_1 - K_2 C_f - K_3 C_s \qquad (4)$$

Equation 4 can be also expressed as:
Meter registration ratio $$(\omega/Q) = K_1 - (K_2 C_f + K_3 C_s) = K_1 - K_4 C_m \qquad (4a)$$

= (meter registration without any rotor slip) − (rotor slip due to overall fluid drag on turbine rotor)

Where
$K_3$, $K_4$ = constants, determined by the geometry of the turbine rotor and the turbulent seal.
$C_s$ = a dimensionless coefficient called "turbulent seal drag coefficient" and defined as
$C_s = D_s/(\frac{1}{2}\rho U^2)(ct)$ Where
$D_s$ = drag force on one blade of the rotor due to the turbulent seal
$U$ = average blade velocity in the turbulent seal
$c$ = blade chord
$t$ = amount of blade protrusion into the recess of the turbulent seal, therefore $(ct)$ is the area of protrusion of one blade into the recess
$C_m$ = a dimensionless coefficient called "overall drag coefficient of the turbine rotor defined as $$C_m = (K_2 C_f + K_3 C_s)/K_4$$

$C_s$ and $C_m$ are functions of Reynolds number.

Thus, the meter registration ratio $\omega/Q$ for a turbine meter incorporating the turbulent seal device of the present invention is a function of the turbulent seal drag coefficient, $C_s$, in addition to the blade drag coefficient $C_f$, whereas the meter registration ratio for a turbine meter without the turbulent seal device is a function of the blade drag coefficient only. This turbulent seal drag coefficient $C_s$ is found to vary in low Reynolds number range. This variation of turbulent seal drag coefficient $C_s$ is believed to be attributable to the change of nature of fluid flow pattern within the turbulent seal recess 107.

Fluid in the turbulent seal recess 107 will flow circumferentially in recess 107 as a result of rotation of rotor 98. There will be no significant axial flow in recess 107. At very small Reynolds numbers of the recess the circumferential flow of fluid is laminar, and, as shown in FIGURE 20, this circumferential flow does not separate at the edges of blades 100. The resulting fluid drag on blades 100 is such that the turbulent seal drag coefficient $C_s$ is inversely proportional to the Reynolds number in the laminar region as shown by the plotted curve 382 in FIGURE 21.

For higher Reynolds numbers of the recess the circumferential fluid flow in recess 107 is turbulent and separates at the edges of blades 100 as shown in FIGURE 22. The fluid drag $D_s$ predominantly caused by the pressure difference between front and back of each blade 100 is almost all due to form drag, and the ratio of projected areas of wake and blade is practically constant. As as result, the drag coefficient of these higher Reynolds numbers where the turbulent circumferential stream separates at the blade edges is also constant as shown in FIGURE 21.

Curve 382 for the turbulent seal drag $D_s$ resulting from the flow characteristics of the circumferential flow in recess 107 shown in FIGURES 20 and 22 is similar in shape to a drag coefficient curve for a disk disposed normal to the path of fluid flow. The inclination of blades 100, the boundary effect of recess 107, and the cascade effect owing to the presence of more than one blade on rotor 98 will effect the magnitude of drag coefficient $C_s$ but they should not change the shape of curve 382.

Figure 21:
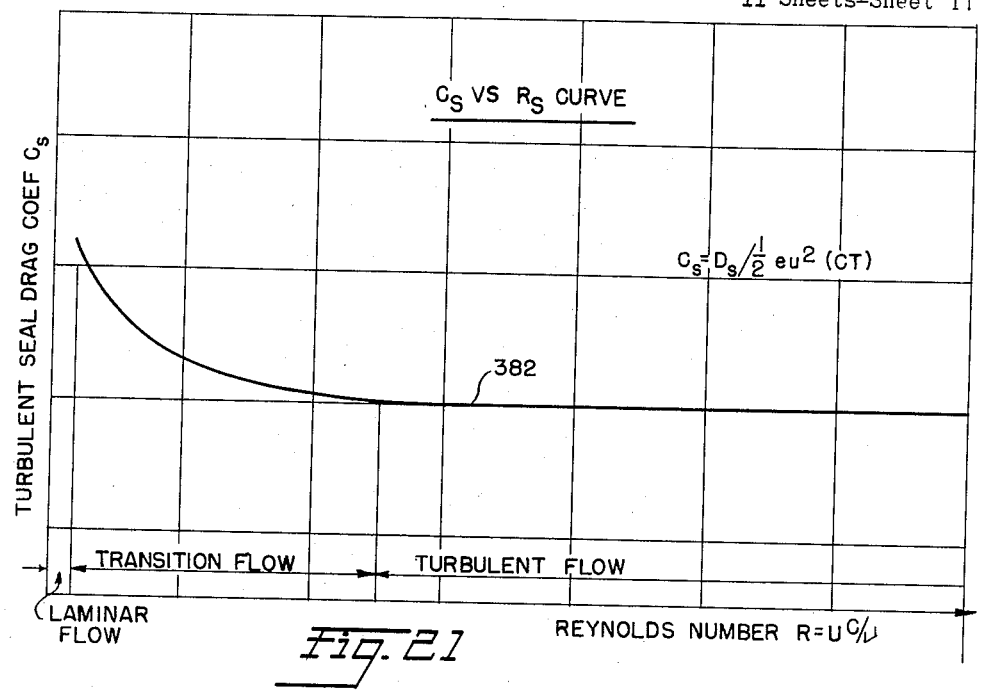
FIGURE 21 illustrates a curve obtained by plotting the turbulent seal drag coefficient $C_s$ against Reynolds number $R_s$.

From FIGURE 21, it is seen that at reasonably large Reynolds numbers of the recess where circumferential flow in recess 107 is turbulent, $C_s$ is practically constant. In the transition flow range, $C_s$ increases, first slowly and then rapidly as the Reynolds number decreases. In the laminar flow region, at very small Reynolds numbers, $C_s$ varies inversely with $R_s$. Since the blade velocity U is practically equal to the fluid velocity W relative to the blade times the sine of blade angle $\beta$ measured from axial direction, $$R_s = \frac{Uc}{v} = \frac{(W \sin \beta)c}{v} = R_c \sin \beta = \text{constant } (R_c).$$

Figure 23:
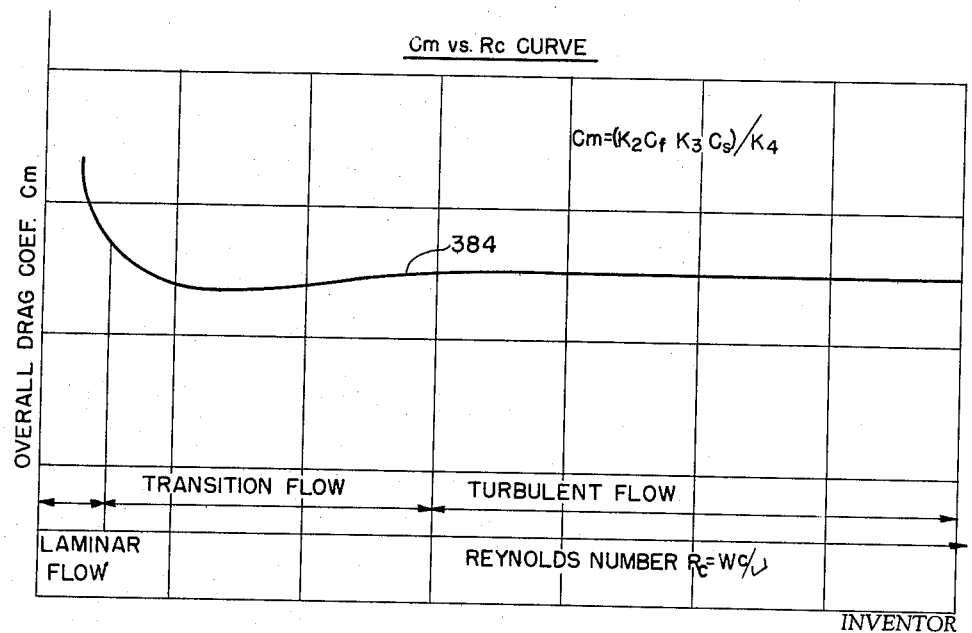
FIGURE 23 illustrates a curve obtained by plotting the overall drag coefficient $C_m$ against Reynolds number $R_c$.

The overal drag coefficient $$C_m = (K_2 C_f + K_3 C_s)/K_4$$

of the turbine meter with turbulent seal can be calculated from the $C_f$ curve 380 (FIGURE 19) and the $C_s$ curve 382 (FIGURE 21) with proper adjustment for the constant ratio between $R_c$ and $R_s$. Based on these calculations, a curve 384 (FIGURE 23) is obtained by plotting values of $C_m$ against $R_c$. The meter registration of Equation 4a of a turbine meter with a turbulent seal of given proportion can then be readily obtained from the $C_m$ curve 384 of FIGURE 23. These values of meter registration are plotted to obtain curve 378 in FIGURE 18.

From the shape of curves 382 and 380 it is clear that in the transition flow range, the turbulent seal drag coefficient $C_s$ (FIGURE 21) increases as the Reynolds number decreases, whereas the blade skin friction drag coefficient $C_f$ (FIGURE 19) decreases as the Reynolds number decreases. This results in a more uniform value of the overall drag coefficient $C_m$ (FIGURE 23) to make accuracy curve 378 substantially flat in the transition flow range. Thus, use of a turbulent seal of suitable dimensions will increase the range of the meter by allowing it to operate accurately, in the transition area. By varying the proportions of the turbulent seal for a given meter, the turbulent seal drag coefficient $C_s$ may be increased by different amounts as the Reynolds number or fluid flow rate decreases. Thus variations in the dimensions of turbulent seal will result in different shapes of the overall drag coefficient $C_m$ curve, and consequently, different shapes of the meter accuracy curve in the transition flow range. Therefore, the proportions of the turbulent seal can be optimized for a given meter with a given $C_f$ curve to yield a most desirable curve of $C_m$ which results in a best possible accuracy curve over the widest possible range of fluid flow rates and fluid viscosities. The significant improvement in the accuracy curve of a turbine meter which can be obtained by means of turbulent seal device is evident either from actual test results as presented in FIGURES 16 and 17, or from physical consideration as shown in FIGURES 18, 19, 21 and 23.

Thus, it is clear that the turbulent seal device of this invention functions to flatten the hump present in unimproved turbine meter accuracy curves by adding a variable drag to the rotor to render the overall drag coefficient $C_m$ constant. In addition, the turbulent seal device, by preventing leakage through the blade tip clearance, raises the tail of the meter accuracy curve in the turbulent flow range to thereby provide a substantially flat accuracy curve extending from low flow rates in the transition flow range to large flow rates in the fully turbulent flow region.

As fluid flows through channel 60 it will be appreciated that the velocity is not precisely uniform across the entire radial distance spanning the inside and outside channel diameters defined by cores 38 and 40 with the meter housing. Instead, there will be thin fluid boundary layers along the core and meter housing surface in which the fluid velocity distribution is non-uniformed. The velocity in these boundary layers decreases practically to zero immediately adjacent to the core and meter housing surfaces. As a result, the blade tip diameter of rotor 98 under certain conditions may be made slightly smaller than, or at least substantially equal to, the meter housing inside diameter $D_1$ without experiencing any significant, untolerable leakage, and an improvement in the flatness of the accuracy curve is obtained so long as the rotor outer diameter is not made so small that it will not be acted upon by the circumferential flow of fluid in recess 107.

The invention may be embodied in other specific forms without departing from the spirit or essential characteristics thereof. The present embodiments are therefore to be considered in all respects as illustrative and not restrictive, the scope of the invention being inidicated by the appended claims rather than by the foregoing description, and all changes which come within the meaning and range of equivalency of the claims are therefore intended to be embraced therein.

What is claimed and described to be secured by United States Letters Patent is:

1. An axial flow impulse type turbine meter comprising:
   (a) a rotatably mounted peripherally bladed turbine rotor,
   (b) means for directing motive fluid into, through and from the blades of said rotor in an annular stream which, circumferentially, is substantially uninterrupted, said annular stream having predetermined inner and outer cylindrical boundaries of predetermined uniform diameters and axial lengths and being disposed coaxial with the rotation axis of said rotor,
   (c) the diameters of said predetermined inner and outer boundaries being respectively greater than the root diameter and smaller than the tip diameter of the blades of said rotor whereby retardation of the inner and outer boundary layers of said stream during its passage through said rotor is avoided.

2. The meter defined in claim 1 wherein said directing means includes:
   (a) means for minimizing leakage of fluid past rotor tip clearance.

3. The meter defined in claim 1 wherein said directing means comprises:
   (a) fluid guide structure having an inlet section upstream of said rotor and an outlet section downstream of said rotor,
   (b) said sections having at the opposite sides of said rotor coaxial cylindrical walls defining said inner and outer boundaries of said stream and terminating at their adjacent ends adjacent said rotor, and
   (c) means interconnecting the exterior ones of said walls and enveloping the tips of the blades of said rotor radially outwardly of the boundary of said annular stream.

4. The meter defined in claim 3 wherein said last named means comprises:
   (a) an annular chamber disposed radially outward of the outer boundary of and open to said annular stream and receiving the tips of said blades.

5. The meter defined in claim 4 wherein said chamber terminates at its opposite axial ends in parallel planar end walls disposed at opposite sides of and normal to the rotation axis of said rotor at the adjacent ends of said fluid guide structure sections and has a cylindrical circumferential wall coaxial with and surrounding said rotor and interconnecting said end walls.

6. The meter defined in claim 3 wherein said fluid guide structure defines an elongated venturi of hollow form.

7. The meter defined in claim 3 wherein said meter includes a register operatively connected to said rotor to indicate the volume of motive fluid flow through said rotor.

8. A turbine meter comprising a housing containing a rotatably mounted bladed turbine meter adapted to drive a register or the like, means for directing motive fluid into the rotor blades in an annular solid stream extending parallel to the axis of rotation of said rotor to impart drive torque to said rotor, the fluid passing through the blades of said rotor imposing a variable fluid drag on said rotor, and means on said rotor cooperating with means on said housing to circumferentially confine fluid around the outer periphery of said rotor for exerting a further fluid drag on said rotor which combines with said variable fluid drag to produce a substantially constant number of revolutions of the rotor per unit volume of fluid flowing through the rotor throughout a range of flow rates which extend into the range of flow rates for the meter between laminar and turbulent flow, said means for directing motive fluid into the rotor blades comprising core means mounted in said housing to define the inner boundary of said annular stream and rotatably support said rotor.

9. A turbine meter comprising a housing containing a rotatably mounted bladed turbine rotor adapted to drive a registering means or the like, means for directing motive fluid into said rotor blades in an annular solid stream parallel to the axis of rotation of said rotor to impart drive torque to said rotor, the fluid passing through the blades imposing a variable fluid drag on said rotor, and cooperating means on the rotor periphery and the surrounding region of said housing for circumferentially confining fluid around the outer periphery of said rotor to apply to said rotor a further variable drag, the combined effect of said drags being to produce a substantially constant number of revolutions of the rotor per unit volume of fluid flowing through the rotor throughout a range of flow rates extending into the meter range of flow rates between laminar and turbulent flow.

10. A turbine meter comprising a housing containing a rotatably mounted bladed turbine rotor adapted to drive a register or the like, means for directing motive fluid into said rotor blades in an uninterrupted annular solid stream of constant cross-section parallel to the axis of rotation of said rotor to impart drive torque to said rotor, the fluid passing through the blades imposing a variable fluid drag on said rotor, and means on said housing for circumferentially confining fluid around the outer periphery of said rotor to apply to said rotor a further variable drag, the combined effect of said drags being to maintain the overall drag coefficient substantially constant over a range of Reynolds numbers which extends into the transition range of Reynolds number values between laminar and turbulent flow.

11. A turbine meter comprising a housing containing a rotatably mounted bladed turbine rotor adapted to drive a register or the like, concentric inner and outer surfaces within the housing for directing motive fluid into said rotor blades in an annular solid stream parallel to the axis of rotation of said rotor to impart drive torque to said rotor, the fluid passing through the blades imposing a variable fluid drag on said rotor, means defining an annular recess in said outer surface for circumferentially confining fluid in said housing around the outer periphery of said rotor to apply to said rotor a further fluid drag, the combined effects of said drags being to produce a substantially constant number of revolutions of the rotor per unit volume of fluid passing through the rotor throughout a fluid flow rate range extending into the range of flow rates for the meter between laminar and turbulent flow.

12. A turbine meter comprising a housing containing a rotatably mounted bladed turbine rotor adapted to drive a registering means, concentric inner and outer surfaces within the housing for directing motive fluid into said rotor blades in an annular solid stream parallel to the axis of rotation of said rotor to impart drive torque to said rotor, the fluid passing through the blades imposing a variable fluid drag on said rotor, means defining an annular recess in the outer surface opening into said stream, the outer periphery of said rotor extending into said recess whereby a further variable drag is applied to said rotor, the combined effect of said drags being to produce a substantially constant number of revolutions of the rotor per unit volume of fluid flowing through the rotor throughout a predetermined range of flow rates through the meter.

13. The turbine meter defined in claim 12 wherein said rotor protrudes into said recess by a distance equal to at least one-half the radial clearance between the periphery of said rotor and said outer surface.

14. The turbine meter defined in claim 12 wherein the side clearance between the surfaces defining said recess and said rotor on each side thereof is at least equal to said radial clearance.

15. The turbine meter defined in claim 12 wherein said recess is formed with spaced apart side walls respectively contained in parallel spaced apart planes extending substantially at right angles to the rotor rotational axis.

16. In a turbine meter,
   (a) a housing,
   (b) a stationary internal surface means within said housing defining a longitudinal fluid flow channel section of annular cross-section,
   (c) a bladed rotor rotatably mounted within the housing having blades adjacent its outer periphery in the path of fluid flow through said channel, the fluid passing through the blades imposing a variable fluid drag on said rotor,
   (d) and means in said surface means defining an inwardly open annular recess circumferentially surrounding said rotor, said recess and the outer periphery of said rotor being so constructed and adjacently arranged that a further fluid drag is imposed upon said rotor which combines with said variable drag to produce a substantially constant number of revolutions of the rotor per unit volume of fluid flow through the rotor throughout a range of flow rates which extends into the transition range of flow rates for the meter between laminar and turbulent flow, (e) said surface means being interrupted at the inner boundary of said channel section to accommodate said rotor, and being interrupted at the outer boundary of said channel section by said annular recess, and (f) the outer diameter of said rotor being at least substantially equal to the outside diameter of said annular flow channel.

17. In a turbine meter,
(a) a housing,
(b) a stationary internal surface means within said housing defining a longitudinal fluid flow channel section of annular cross-section,
(c) a bladed rotor rotably mounted within the housing having blades adjacent its outer periphery in the path of fluid flow through said channel, the fluid passing through said blades imposing a variable fluid drag on said rotor,
(d) and means in said surface means defining an inwardly open annular recess circumferentially surrounding said rotor with the outer periphery of said rotor projecting into said recess, said recess and the outer periphery of said rotor being so constructed and adjacently arranged that a further fluid drag is imposed upon said rotor which combines with said variable drag to produce a substantially constant number of revolutions of the rotor per unit volume of fluid flow through the rotor throughout a range of flow rates which extends into the transition range of flow rates for the meter between laminar and turbulent flow.

References Cited by the Examiner
UNITED STATES PATENTS

| | | | |
|---|---|---|---|
| 789,110 | 5/1905 | Warren | 73—231 |
| 1,463,865 | 8/1923 | Blair | 73—230 |

FOREIGN PATENTS

| | | |
|---|---|---|
| 14,060 | 4/1952 | Great Britain. |

RICHARD C. QUEISSER, *Primary Examiner.*

JAMES J. GILL, *Examiner.*